(12) United States Patent
Takami et al.

(10) Patent No.: US 11,883,912 B2
(45) Date of Patent: Jan. 30, 2024

(54) WELDING POWER SUPPLY DEVICE

(71) Applicant: DAIHEN CORPORATION, Osaka (JP)

(72) Inventors: Chikanori Takami, Osaka (JP); Hikaru Mizushima, Osaka (JP); Ichiro Umezawa, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 403 days.

(21) Appl. No.: 16/605,303

(22) PCT Filed: Apr. 4, 2018

(86) PCT No.: PCT/JP2018/014407
§ 371 (c)(1),
(2) Date: Oct. 15, 2019

(87) PCT Pub. No.: WO2018/193843
PCT Pub. Date: Oct. 25, 2018

(65) Prior Publication Data
US 2020/0122266 A1 Apr. 23, 2020

(30) Foreign Application Priority Data
Apr. 21, 2017 (JP) .................................. 2017-084593

(51) Int. Cl.
*B23K 9/10* (2006.01)
*B23K 9/073* (2006.01)
(Continued)

(52) U.S. Cl.
CPC ............ *B23K 9/1043* (2013.01); *B23K 9/073* (2013.01); *H02M 3/155* (2013.01); *H02M 7/48* (2013.01)

(58) Field of Classification Search
CPC .... B23K 9/1043; B23K 9/073; B23K 9/1012; B23K 9/1006; B23K 9/091
See application file for complete search history.

(56) References Cited

U.S. PATENT DOCUMENTS 4,876,433 A * 10/1989 Kashima ............... B23K 9/1056
219/130.51
5,343,017 A * 8/1994 Karino ................. B23K 9/0738
219/130.51
(Continued)

FOREIGN PATENT DOCUMENTS

CA 2924804 A1 * 5/2015 ........... B23K 9/1012
GB 2320627 A * 6/1998 ........... B23K 9/0673
(Continued)

OTHER PUBLICATIONS

GaryR, "Can a standard DC power supply be used as a current source?", Apr. 2, 20127, Watt's Up? (Year: 2012).*
(Continued)

*Primary Examiner* — John J Norton
*Assistant Examiner* — Franklin Jefferson Wang
(74) *Attorney, Agent, or Firm* — Hamre, Schumann, Mueller & Larson, P.C.

(57) ABSTRACT

A welding power supply device includes an inverter for converting DC power into AC power outputted to a welding load, and a voltage circuit for superimposing a restriking voltage on an output to the welding load when the polarity of output current of the inverter switches. The voltage circuit includes a restriking capacitor charged with the re-striking voltage, a charging circuit to charge the capacitor with the restriking voltage, and a discharging circuit to discharge the voltage in the capacitor. The charging circuit includes a DC power supply and a booster to boost DC voltage from the DC power supply. The charging circuit charges the restriking capacitor in first and second states. In the first state, the DC
(Continued)

voltage from the DC power supply is directly applied to the re-striking capacitor. In the second state, DC voltage boosted by the booster is applied to the restriking capacitor.

6 Claims, 10 Drawing Sheets

(51) Int. Cl.
  *H02M 3/155* (2006.01)
  *H02M 7/48* (2007.01)

(56) References Cited

U.S. PATENT DOCUMENTS

| | | | | |
|---|---|---|---|---|
| 10,369,649 | B2* | 8/2019 | Dodge | B23K 9/1081 |
| 2005/0284849 | A1* | 12/2005 | Eldridge | B23K 10/006 |
| | | | | 219/121.57 |
| 2010/0170880 | A1* | 7/2010 | Hsu | B23K 9/0953 |
| | | | | 219/130.1 |
| 2011/0220620 | A1* | 9/2011 | Vogel | B23K 9/1006 |
| | | | | 219/110 |
| 2015/0314387 | A1* | 11/2015 | Starzengruber | H02M 3/1582 |
| | | | | 219/130.33 |
| 2018/0117698 | A1* | 5/2018 | Schartner | B23K 9/1056 |
| 2018/0120383 | A1* | 5/2018 | Nishiyama | G01R 31/367 |

FOREIGN PATENT DOCUMENTS

| | | |
|---|---|---|
| JP | 1-152965 A | 6/1989 |
| JP | 3-78469 A | 4/1991 |
| JP | 3-180276 A | 8/1991 |
| JP | 3-234365 A | 10/1991 |
| JP | 6-91369 A | 4/1994 |
| JP | 2004-96934 A | 3/2004 |

OTHER PUBLICATIONS

Donovan Johnathan, "Development and Implementation of a Battery Cycler", Spring 2016, Zhang's Research Group (Year: 2016).*
International Search Report issued in PCT/JP2018/014407, dated Jul. 10, 2018 (1 page).

* cited by examiner

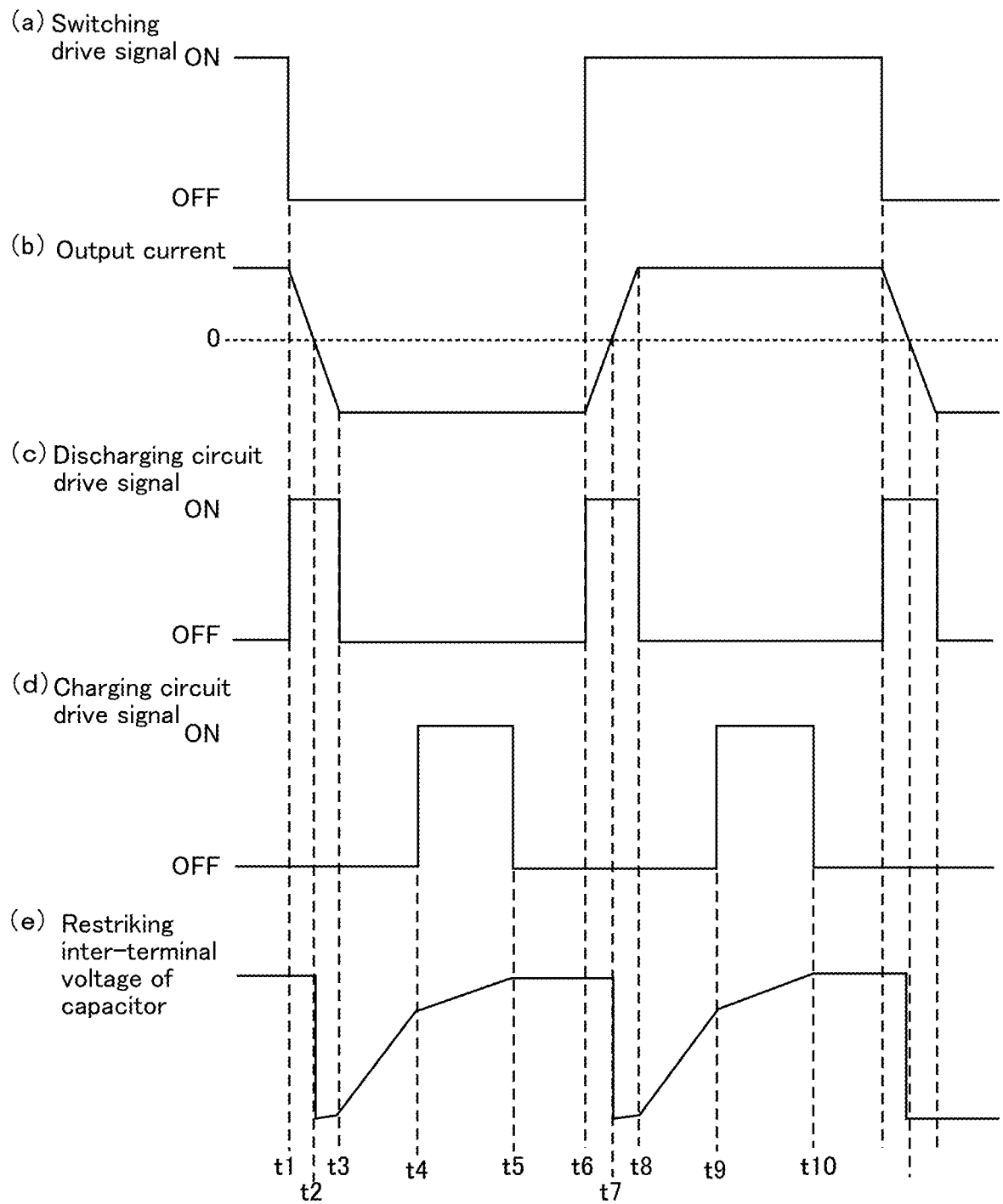

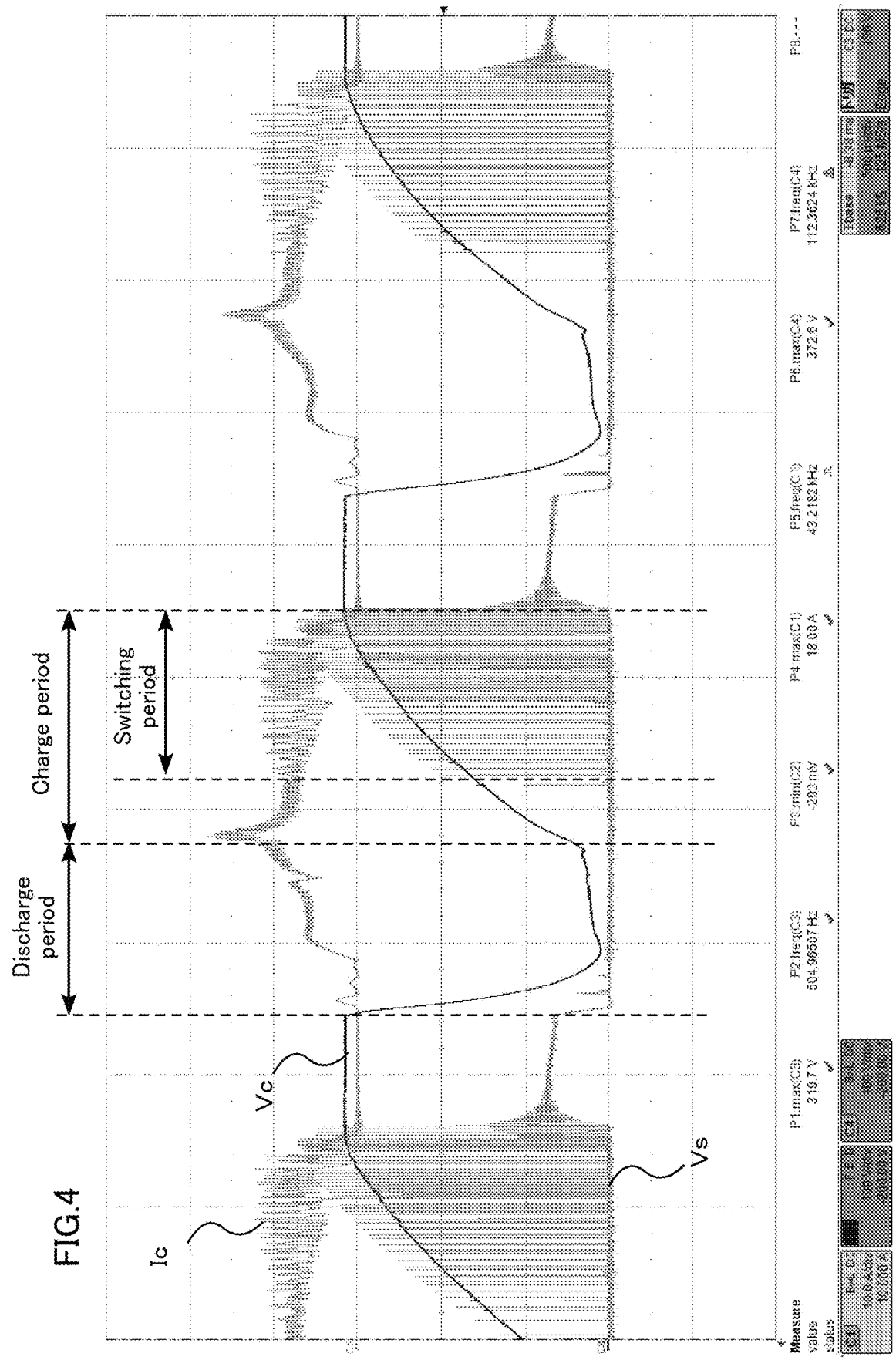

WELDING POWER SUPPLY DEVICE

TECHNICAL FIELD

The present disclosure relates to a power supply device used for a welding system. In particular, the present disclosure relates to a welding power supply device for AC arc welding.

BACKGROUND ART

In conventional AC arc welding, an arc break tends to occur when the polarity of output current is switched. One known method for suppressing arc breaks is to apply high voltage (restriking voltage) when the polarity of output current is switched. An example of a welding power supply device having such a configuration is disclosed in Patent document 1.

PRIOR ART DOCUMENT

Patent Document

Patent Document 1: JP-A-H06-91369

The method for suppressing arc breaks by applying restriking voltage is effective when the polarity switching frequency of output current is low. However, when the polarity switching frequency is high, the voltage desirable for restriking may not be obtained due to insufficient charging time, for example. In such a case, energy shortage for restriking occurs to cause an arc break.

SUMMARY

Problem to be Solved by the Invention

The present disclosure has been proposed under the foregoing circumstances. An object of the present disclosure is to provide a technique capable of suppressing an arc break more appropriately than conventional techniques even when the polarity switching frequency of output current is high.

Means for Solving the Problem

One aspect of the present disclosure provides a welding power supply device that includes: an inverter circuit that converts DC power into AC power and outputs the AC power to a welding load; and a voltage superimposing circuit that superimposes a restriking voltage on an output to the welding load when a polarity of an output current of the inverter circuit switches. The voltage superimposing circuit includes: a restriking capacitor to be charged with the restriking voltage; a charging circuit that charges the restriking capacitor with the restriking voltage; and a discharging circuit that discharges the restriking voltage charged in the re-striking capacitor. The charging circuit includes: a DC power supply that outputs DC voltage; and a voltage booster that boosts a DC voltage of the DC power supply. The charging circuit charges the restriking capacitor in a first state and a second state following the first state, where the first state is a state in which the DC voltage of the DC power supply is directly applied to the restriking capacitor, and the second state is a state in which the DC voltage boosted by the voltage booster is applied to the restriking capacitor.

According to the foregoing configuration, the charging circuit can quickly charge the restriking capacitor by directly applying the DC voltage of the DC power supply when the charging circuit is in the first state. Thereafter, the charging circuit charges the restriking capacitor to a predetermined voltage by applying the DC voltage boosted by the voltage booster when the charging circuit is in the second state. This makes it possible to charge the restriking capacitor to the predetermined voltage more quickly than when charging is performed with the voltage boosted by the voltage booster from the beginning. That is, as compared to the conventional technology, it is possible to shorten the time required for the restriking capacitor to be charged to the predetermined voltage. Accordingly, even if the polarity switching frequency is high, an arc break can be suppressed more appropriately than the conventional technology.

BRIEF DESCRIPTION OF DRAWINGS

FIG. 3 is a time chart showing the waveform of each signal according to the first embodiment;

FIG. 4 shows a result of simulating an operation of a voltage superimposing circuit according to the first embodiment;

MODE FOR CARRYING OUT THE INVENTION

The following describes embodiments of the present disclosure with reference to the attached drawings.

Figure 1:
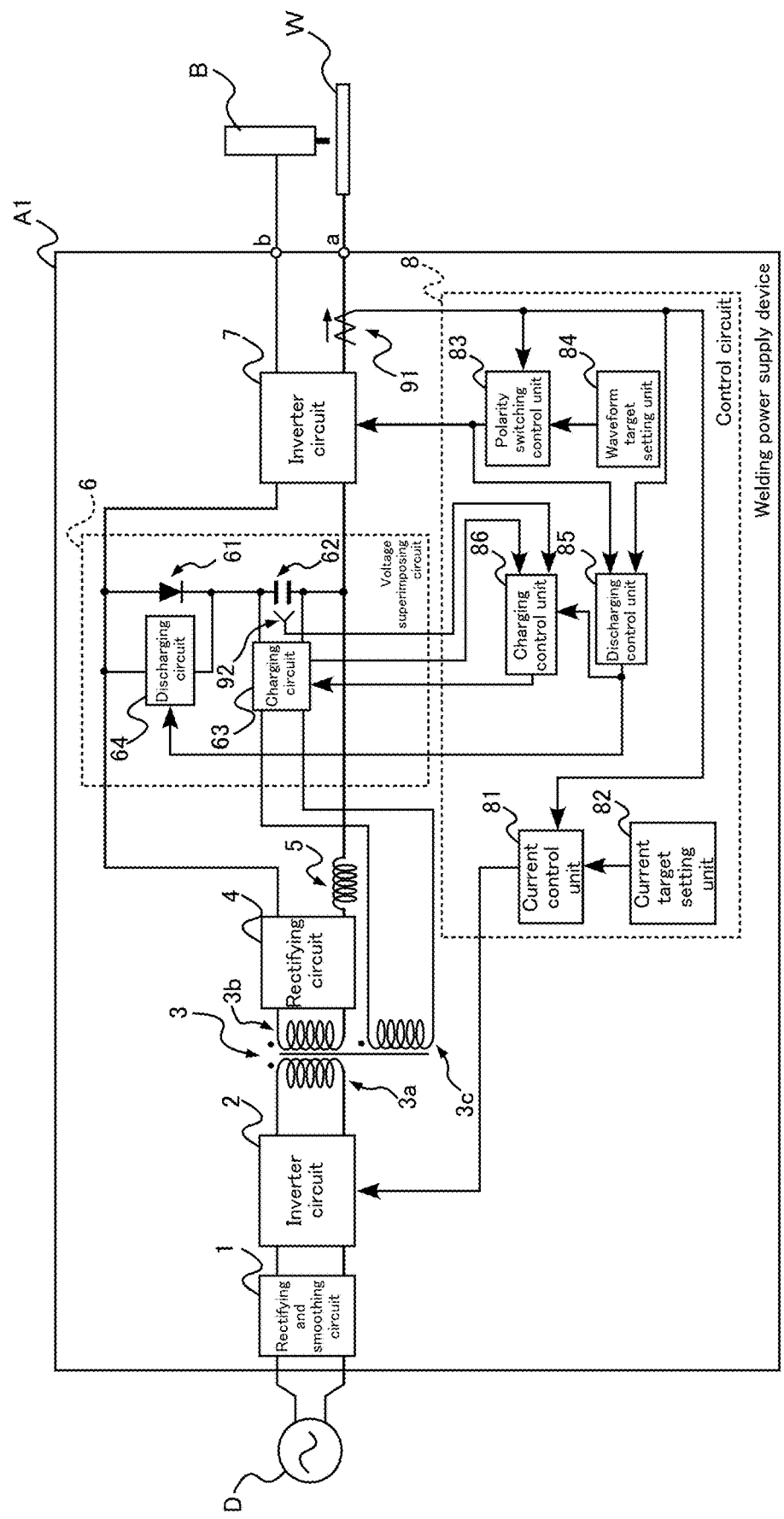
FIG. 1 is a block diagram showing a welding power supply device according to a first embodiment.
Figure 2A:
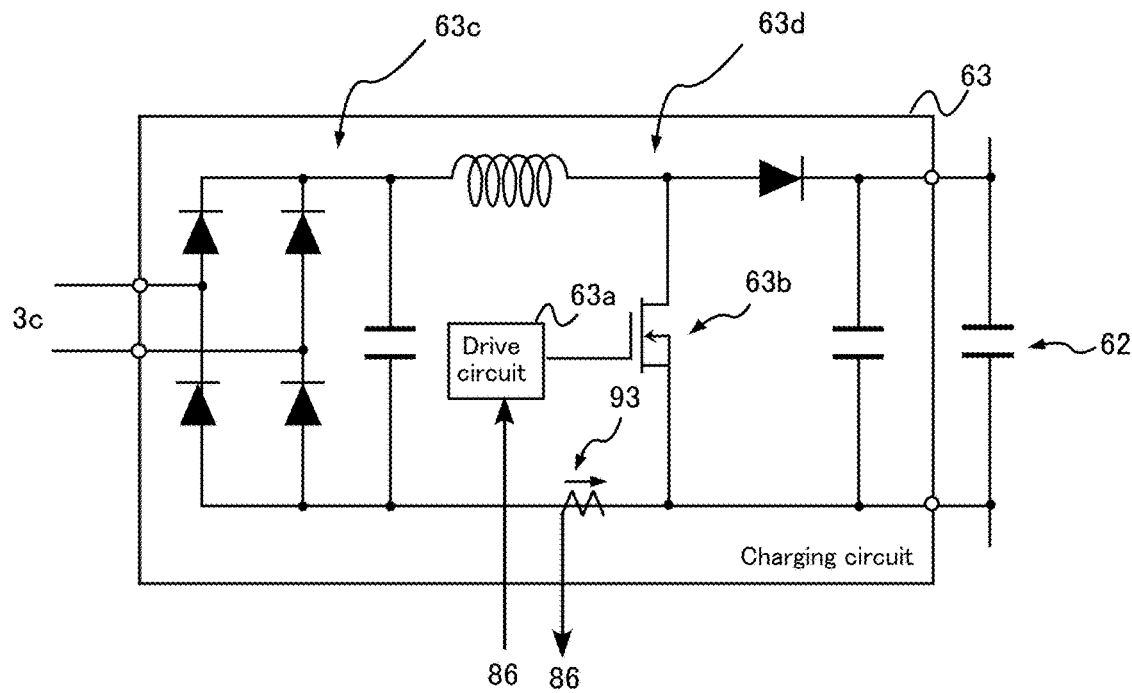
FIG. 2A is a circuit diagram showing a charging circuit according to the first embodiment.
Figure 2B:
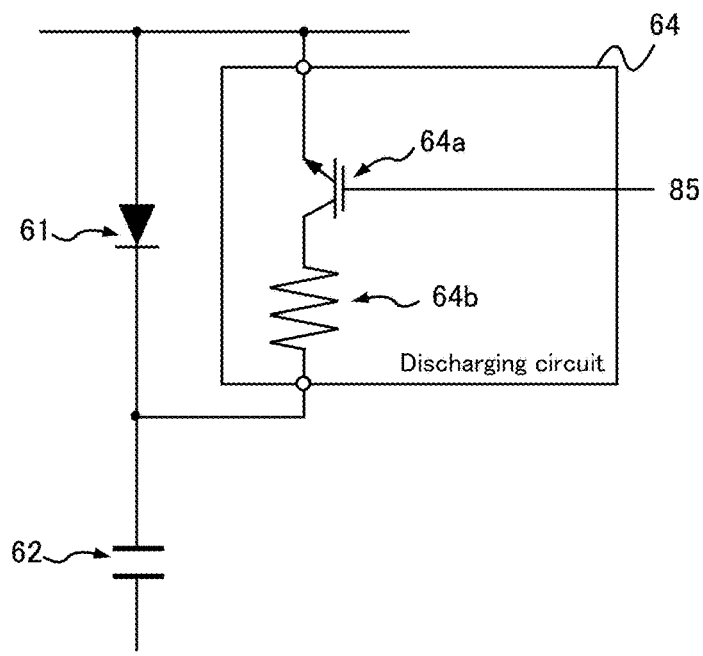
FIG. 2B is a circuit diagram showing a discharging circuit according to the first embodiment.

FIGS. 1 to 3 are diagrams for explaining a welding power supply device A1 according to a first embodiment. Specifically, FIG. 1 shows the overall configuration of a welding system including the welding power supply device A1. FIG. 2A and FIG. 2B show a charging circuit 63 and a discharging circuit 64, respectively, in the welding power supply device A1. FIG. 3 is a time chart showing the waveforms of signals used in the welding power supply device A1.

As shown in FIG. 1, the welding system includes the welding power supply device A1 and a welding torch B. The welding system may be a TIG welding system configured to perform AC arc welding. In general, the welding power supply device A1 converts AC power from a commercial power supply D into power suitable for welding, and outputs the power from output terminals a and b. The first output terminal a is connected to a workpiece W by a cable. The second output terminal b is connected to an electrode of the welding torch B by another cable. The power supplied from the welding power supply device A1 causes an arc to be generated between the tip of the electrode of the welding torch B and the workpiece W, and welding is performed with the heat from the arc. In the present embodiment, the combination of the welding torch B, the workpiece W, and an arc is referred to as a "welding load". Note that one of these three elements or a combination that includes only two of these three elements may also be referred to as a "welding load". More generally, the "welding load" in the present disclosure refers to a set of elements that are connected to the output terminals a and b of the welding power supply device A1 to form a current path, and that substantially consume power. In this regard, elements that consume a relatively small amount of power, such as a simple connecting element (e.g., a cable connecting the output terminal a and the workpiece W), are not included in the "welding load". However, the present disclosure is not limited to this implementation.

As shown in FIG. 1, the welding power supply device A1 includes a rectifying and smoothing circuit 1, a first inverter circuit 2, a transformer 3, a rectifying circuit 4, a DC reactor 5, a voltage superimposing circuit 6, a second inverter circuit 7, a control circuit 8, a first current sensor 91, a voltage sensor 92, and a second current sensor 93 (see FIG. 2A). In the present disclosure, the terms "first", "second", etc., are merely used to distinguish similar elements from each other, and do not have any substantial meaning such as the importance (e.g., functional importance) among the elements.

The rectifying and smoothing circuit 1 converts the AC power received from the commercial power supply D into DC power, and outputs the DC power. The rectifying and smoothing circuit 1 includes a rectifying circuit that rectifies an alternating current, and a smoothing circuit (smoothing capacitor) that smooths the rectified current.

The inverter circuit 2 may be a PWM control inverter of a single-phase full bridge type, and may include four switching elements. The inverter circuit 2 converts the DC power received from the rectifying and smoothing circuit 1 into AC power (e.g., predetermined high frequency power) by switching (on/off driving) each of the switching elements with a drive signal received from the control circuit 8, and outputs the AC power. The inverter circuit 2 is not limited to a single-phase full bridge inverter circuit, and may be a half-bridge inverter circuit or an inverter circuit having a different configuration.

The transformer 3 transforms the voltage of the AC power received from the inverter circuit 2, and outputs the AC power having the transformed voltage. Specifically, the transformer 3 includes a primary winding 3a, a secondary winding 3b, and an auxiliary winding 3c. The input terminals of the primary winding 3a are respectively connected to the output terminals of the inverter circuit 2. The output terminals of the secondary winding 3b are respectively connected to the input terminals of the rectifying circuit 4. The output terminals of the auxiliary winding 3c are respectively connected to the input terminals of the charging circuit 63. The output voltage from the inverter circuit 2 is transformed according to the turn ratio between the primary winding 3a and the secondary winding 3b, and the AC power after the transformation is output to the rectifying circuit 4. Output voltage from the inverter circuit 2 is transformed according to the turn ratio between the primary winding 3a and the auxiliary winding 3c, and the AC power after the transformation is output to the charging circuit 63.

The rectifying circuit 4 may be a full-wave rectifying circuit. The rectifying circuit 4 rectifies the AC power received from the transformer 3, and outputs the rectified power (DC power) to the inverter circuit 7. The rectifying circuit 4 may be a half-wave rectifying circuit instead of a full-wave rectifying circuit. In the present embodiment, an output terminal of the rectifying circuit 4 is connected to the DC reactor 5. The DC reactor 5 smooths the DC current output from the rectifying circuit 4.

The inverter circuit 7 may be a PWM control inverter of a single-phase full bridge type, and may include four switching elements. The inverter circuit 7 converts the DC power received from the rectifying circuit 4 into AC power by switching (on/off driving) each of the switching elements with a switching drive signal received from the control circuit 8, and outputs the AC power after the conversion. The inverter circuit 7 is not limited to a single-phase full bridge inverter circuit, and may be a half-bridge inverter circuit or an inverter circuit having a different configuration.

The voltage superimposing circuit 6 is arranged between the rectifying circuit 4 and the second inverter circuit 7. When the polarity of the output current of the inverter circuit 7 is to be switched, a predetermined voltage (e.g., predetermined high voltage) is applied to the output terminals a and b of the welding power supply device A1 (e.g., a different voltage is superimposed on the already output voltage). The high voltage is for improving the restriking characteristic at the time of switching the polarity, and is referred to as the "restriking voltage" in the following descriptions where appropriate. The voltage superimposing circuit 6 includes a diode 61, a capacitor ("restriking capacitor") 62, the charging circuit 63, and the discharging circuit 64.

The capacitor 62 has a capacitance larger than a predetermined reference value, and is charged with high voltage ("restriking voltage") that is to be superimposed on the output of the welding power supply device A1. The capacitor 62 is connected in parallel to the rectifying circuit 4. The capacitor 62 is charged by the charging circuit 63 and is discharged by the discharging circuit 64.

The charging circuit 63 is connected in parallel to the capacitor 62, and charges the capacitor 62 with the restriking voltage. As shown in FIG. 2A, the charging circuit 63 includes a rectifying and smoothing circuit 63c and a boost chopper 63d. The rectifying and smoothing circuit 63c includes a rectifying circuit that performs full-wave rectification on an alternating current, and a smoothing capacitor. The rectifying and smoothing circuit 63c converts the AC voltage received from the auxiliary winding 3c of the transformer 3 into DC voltage, and outputs the DC voltage. In other words, the rectifying and smoothing circuit 63c functions as a "(DC) power supply" in the charging circuit 63. The configuration of the rectifying and smoothing circuit 63c is not limited to the illustrated example.

The boost chopper 63d boosts the DC voltage received from the rectifying and smoothing circuit 63c, and outputs the boosted DC voltage to the capacitor 62. The boost chopper 63d is configured in a manner such that a coil and a diode are connected in series between an input terminal and an output terminal (with one of the terminals of the coil being connected to the anode terminal of the diode, the coil being arranged on the input terminal side, the diode being arranged on the output terminal side), a switching element 63b is connected in parallel to the connection between the coil and the diode, and a capacitor is connected in parallel to the cathode terminal of the diode in parallel. Note that the illustrated example does not limit the configuration of the boost chopper 63d.

In the present embodiment, the switching element 63*b* is a metal oxide semiconductor field effect transistor (MOSFET). Alternatively, the switching element 63*b* may be a bipolar transistor such as an insulated gate bipolar transistor (IGBT).

The boost chopper 63*d* includes a drive circuit 63*a* for driving the switching element 63*b*. The drive circuit 63*a* outputs a pulse signal for driving the switching element 63*b*, based on a charging circuit drive signal received from a charging control unit 86 (described later). The drive circuit 63*a* does not output any pulse signals while the charging circuit drive signal is off (e.g., in a relatively low level state). During this period, the switching element 63*b* remains to be in off state. Accordingly, the DC voltage from the rectifying and smoothing circuit 63*c* is directly applied to the capacitor 62 to charge the capacitor 62. On the other hand, the drive circuit 63*a* outputs a predetermined pulse signal while the charging circuit drive signal is on (e.g., in a relatively high level state). This causes the boost chopper 63*d* to operate to boost the DC voltage from the rectifying and smoothing circuit 63*c*. The boosted DC voltage is applied to the capacitor 62 to charge the capacitor 62.

In this way, the charging circuit 63 of the present embodiment is configured to switch between two states based on the charging circuit drive signal for applying voltage to the capacitor 62. Specifically, the charging circuit 63 switches between a state in which the voltage from the rectifying and smoothing circuit 63*c* is directly (without conversion) applied to the capacitor 62 and another state in which boosted voltage is applied to the capacitor 62.

Instead of the configuration shown in FIG. 2A, it is possible to employ a configuration without the drive circuit 63*a*. In this case, the charging control unit 86 may directly input a pulse signal (charging circuit drive signal) to the switching element 63*b*.

The discharging circuit 64 is connected to the capacitor 62 in series, and discharges the restriking voltage charged in the capacitor 62. As shown in FIG. 2B, the discharging circuit 64 includes a switching element 64*a* and a resistor (current limiting resistor) 64*b*. In the present embodiment, the switching element 64*a* is an IGBT. Note that the switching element 64*a* may be a bipolar transistor, a MOSFET, or the like. A collector terminal of the switching element 64*a* is connected to an end of the resistor 64*b*, and the other end of the resistor 64*b* is connected to the capacitor 62. An emitter terminal of the switching element 64*a* is connected to a positive terminal of the rectifying circuit 4. A gate terminal of the switching element 64*a* receives a discharging circuit drive signal from a discharging control unit 85 (described later). Note that the resistor 64*b* may be connected to the emitter terminal of the switching element 64*a*.

The switching element 64*a* is on when the discharging circuit drive signal is on (e.g., at a relatively high level). As a result, the restriking voltage charged in the capacitor 62 is discharged and superimposed on the output voltage of the rectifying circuit 4 via the resistor 64*b*. On the other hand, the switching element 64*a* is off when the discharging circuit drive signal is off (e.g., at a relatively low level). The discharge of the restriking voltage is thereby stopped. In other words, the discharging circuit 64 causes the capacitor 62 to discharge or not to discharge, based on the discharging circuit drive signal. The configuration of the discharging circuit 64 is not limited to that in the illustrated example.

The diode 61 is connected to the discharging circuit 64 in parallel, with its anode terminal being connected to a positive input terminal of the inverter circuit 7 and its cathode terminal being connected to the capacitor 62. The diode 61 is provided to cause the capacitor 62 to absorb a transient voltage that may be generated when a voltage is input to the inverter circuit 7.

A current sensor 91 detects an output current of the welding power supply device A1. In the present embodiment, the current sensor 91 is arranged on the connection line that connects an output terminal of the inverter circuit 7 and the output terminal a of the welding power supply device A1. However, the current sensor 91 may be arranged at a different position. The current sensor 91 detects the instantaneous value of an output current and outputs the detection result to the control circuit 8. It is assumed that the current flowing from the inverter circuit 7 to the output terminal a is positive, and that the current flowing from the output terminal a to the inverter circuit 7 is negative, but it is not limited to such.

The voltage sensor 92 detects the voltage between the terminals (inter-terminal voltage) of the capacitor 62. The voltage sensor 92 detects the instantaneous value of the inter-terminal voltage and outputs the detection result to the control circuit 8.

The current sensor 93 detects the charging current of the charging circuit 63. In the present embodiment, the current sensor 93 is arranged on the connection line that connects a negative output terminal of the rectifying and smoothing circuit 63*c* and a negative input terminal of the boost chopper 63*d*. However, the current sensor 93 may be arranged at a different position. The current sensor 93 detects the instantaneous value of a charging current and outputs the detection result to the control circuit 8.

The control circuit 8 is provided to control the welding power supply device A1, and is realized by a microcomputer, for example. The control circuit 8 receives the instantaneous value of the output current from the current sensor 91, the instantaneous value of the inter-terminal voltage of the capacitor 62, and the instantaneous value of the charging current from the current sensor 93. The control circuit 8 outputs a drive signal to each of the inverter circuit 2, the inverter circuit 7, the charging circuit 63, and the discharging circuit 64. The control circuit 8 includes a current control unit 81, a current target setting unit 82, a polarity switching control unit 83, a waveform target setting unit 84, the discharging control unit 85, and the charging control unit 86.

The current control unit 81 controls the inverter circuit 2. The current control unit 81 calculates an effective value based on the instantaneous value of the output current received from the current sensor 91. The current control unit 81 generates a drive signal based on both the calculated effective value and a target effective value received from the current target setting unit 82, and outputs the drive signal to the inverter circuit 2. The switching elements of the inverter circuit 2 are controlled based on the drive signal.

The polarity switching control unit 83 controls the inverter circuit 7. The polarity switching control unit 83 generates a switching drive signal, based on the instantaneous value of an output current received from the current sensor 91 and a current waveform target value received from the waveform target setting unit 84, and outputs the switching drive signal to the inverter circuit 7. The switching elements of the inverter circuit 7 are controlled based on the switching drive signal.

The discharging control unit 85 controls the discharging circuit 64. The discharging control unit 85 generates a discharging circuit drive signal, based on the instantaneous value of an output current received from the current sensor 91 and the switching drive signal received from the polarity switching control unit 83, and outputs the discharging circuit drive signal to the discharging circuit 64. The discharging circuit 64 is controlled based on the discharging circuit drive signal. The discharging circuit drive signal is also output to the charging control unit 86.

As shown in FIG. 3, the output current (see (b)) of the welding power supply device A1 varies according to the switching drive signal (see (a)). When the switching drive signal is on, the output terminal a (workpiece W) is positive and the output terminal b (welding torch B) is negative. When the switching drive signal is off, the output terminal a (workpiece W) is negative and the output terminal b (welding torch B) is positive. The output current of the welding power supply device A1 begins to decrease when the switching drive signal is switched from on to off (time t1), and continues to decrease to zero at time t2. Even after time t2, the output current of the welding power supply device A1 still continues to decrease (and the polarity is reversed), and indicates the minimum value at time t3. The minimum value is maintained from time t3 to t6.

When the switching drive signal is switched from off to on (time t6), the output current of the welding power supply device A1 begins to increase from the minimum value, becomes zero at time t7 (and then the polarity is reversed), and reaches the maximum current value at time t8.

The discharging control unit 85 generates and outputs the discharging circuit drive signal (see (c) in FIG. 3). In the present embodiment, the discharging circuit drive signal is a pulse signal that is on at least when the polarity changes (when the polarity of the output current of the welding power supply device A1 changes, such as t2 or t7). Specifically, the discharging circuit drive signal generated by the discharging control unit 85 is a pulse signal that is switched on when the switching drive signal is switched on or off (time t1, t6), and that is switched off when the instantaneous value of the output current is minimum or maximum (time t3, t8). In practice, the current instantaneous value received from the current sensor 91 fluctuates slightly; therefore, the discharging control unit 85 determines that the current value is maximum when the current instantaneous value is greater than or equal to a predetermined threshold value (first threshold value), and determines that the current value is minimum when the current instantaneous value is less than or equal to a predetermined threshold value (second threshold value smaller than the first threshold value).

The discharging control unit 85 may generate the discharging circuit drive signal by using a method other than the method described above. An essential point is to output a restriking voltage when the polarity of the output current of the welding power supply device A1 changes. Accordingly, the discharging circuit drive signal may switch on before the polarity changes and may switch off after the polarity changes. For example, the discharging circuit drive signal may be switched off when a predetermined time period elapses after the instantaneous value of the output current becomes zero. Furthermore, the discharging control unit 85 may receive the current waveform target value from the waveform target setting unit 84, instead of receiving the switching drive signal from the polarity switching control unit 83, and may switch the discharging circuit drive signal on when the current waveform target value is changed. In this case, the waveform of the discharging circuit drive signal is the same as when switching is performed based on the switching drive signal. Furthermore, the discharging control unit 85 may only receive the instantaneous value of the output current from the current sensor 91, and may switch the discharging circuit drive signal when the instantaneous value of the output current is smaller than the maximum current value or when the instantaneous value is larger than the minimum current value. In this case, the waveform of the discharging circuit drive signal is the same as when switching is performed based on the switching drive signal. Alternatively, the first threshold value may be set to a value smaller than the maximum current value and larger than zero, and the second threshold value may be set to a value larger than the minimum current value and smaller than zero. Then, the discharging circuit drive signal may be switched on when the instantaneous value of the output current is within the range between the first threshold value and the second threshold value, and may be switched off when the instantaneous value is out of said range. Even in this case, the discharging circuit drive signal is on before the polarity changes and is off after the polarity changes.

The charging control unit 86 controls the charging circuit 63. The charging control unit 86 generates a charging circuit drive signal for controlling the charging circuit 63, based on the instantaneous value of the charging current received from the current sensor 93, the instantaneous value of the inter-terminal voltage of the capacitor 62 received from the voltage sensor 92, and the discharging circuit drive signal received from the discharging control unit 85, and outputs the charging circuit drive signal to the charging circuit 63.

As shown in FIG. 3, the inter-terminal voltage (e) of the capacitor 62 decreases due to discharge, when the discharging circuit drive signal (c) is on (time t1) and the polarity of the output current (b) changes (time t2). It is necessary to charge the capacitor 62 with the restriking voltage before the next discharge timing (time t7). Accordingly, the configuration may be such as to start charging the capacitor 62 when, for example, the discharge of the capacitor 62 ends (time t3). In the present embodiment, charging is performed even during discharging. Thus, the inter-terminal voltage of the capacitor 62 slightly increases from time t2 to time t3. In the initial charging period for the capacitor 62, the charging control unit 86 keeps the charging circuit drive signal (d) in off state. During this period, the DC voltage output from the rectifying and smoothing circuit 63c is directly applied to the capacitor 62 to rapidly charge the capacitor 62 (see the linear inclination between times t3 to t4 in FIG. 3(e)).

When the inter-terminal voltage of the capacitor 62 is equal to the output voltage of the rectifying and smoothing circuit 63c (time t4), the charging control unit 86 switches the charging circuit drive signal on. When the charging current detected by the current sensor 93 (FIG. 2A) reaches a predetermined current value or below after discharging ends, the charging control unit 86 determines that the inter-terminal voltage of the capacitor 62 has reached the output voltage of the rectifying and smoothing circuit 63c and switches the charging circuit drive signal on. At this point, the DC voltage output from the rectifying and smoothing circuit 63c is boosted and applied to the capacitor 62, whereby the capacitor 62 is charged to a predetermined voltage (time t5 in FIG. 3(e)). When the capacitor 62 is charged to the predetermined voltage, the charging control unit 86 switches the charging circuit drive signal off because no further charging is necessary. In other words, the charging control unit 86 generates a pulse signal that switches on when the discharge drive signal received from the discharging control unit 85 is switched from on to off and the charging current detected by the current sensor 93 reaches a predetermined current value or less (t4, t9), and that switches off when the inter-terminal voltage of the capacitor 62 reaches a predetermined voltage (t5, t10). Then, the charging control unit 86 outputs the pulse signal as the charging circuit drive signal (d).

FIG. 4 shows the result of simulating an operation of the voltage superimposing circuit 6 in the welding power supply device A1 shown in FIG. 1. Vc indicates the waveform of the instantaneous values of the inter-terminal voltage of the capacitor 62, which is detected by the voltage sensor 92. Ic indicates the waveform of the instantaneous values of the charging current of the charging circuit 63, which is detected by the current sensor 93. Vs indicates the waveform of the instantaneous values of the drain-source voltage of the switching element 63b.

A discharge period begins when the discharging circuit drive signal is on and the polarity of the output current of the welding power supply device A1 is changed. As shown in FIG. 4, the discharging circuit 64 causes the capacitor 62 to discharge at the start of the discharge period, and thus the voltage Vc decreases. On the other hand, even during the discharge period, if the inter-terminal voltage Vc of the capacitor 62 falls below the output voltage of the rectifying and smoothing circuit 63c, the charging current Ic flows to charge the capacitor 62. Accordingly, the voltage Vc rises in the latter half of the discharge period.

After the discharging circuit drive signal is off and the discharge period ends, a charge period begins in which the capacitor 62 is rapidly charged with the output voltage of the rectifying and smoothing circuit 63c. In this period, the voltage Vc rapidly rises as shown in FIG. 4. On the other hand, the charging current Ic initially rises but then changes to fall. In the present embodiment, when the charging current Ic reaches a predetermined current value or below, it is determined that the inter-terminal voltage of the capacitor 62 is equal to the output voltage of the rectifying and smoothing circuit 63c (240 V in the present simulation), and the charging circuit drive signal is switched on. As a result, a switching period begins in which switching of the boost chopper 63d (switching element 63b) is performed. During the switching period, the DC voltage output from the rectifying and smoothing circuit 63c is boosted and output to the capacitor 62 to further charge the capacitor 62. As shown in FIG. 4, voltage Vs and the charging current Ic are varied according to the switching.

When the voltage Vc reaches a predetermined voltage (300 V in the present simulation), the charging circuit drive signal is off, and the switching period (and the charging period) ends. Until the next discharge period begins, the charging current Ic is "0", the voltage Vs is substantially constant, and the voltage Vc keeps the predetermined voltage.

Next, the operations and advantages of the welding power supply device according to the present embodiment will be described.

According to the present embodiment, when charging begins, the charging circuit 63 directly applies, to the capacitor 62, the DC voltage received from the rectifying and smoothing circuit 63c to thereby rapidly charge the capacitor 62. When the inter-terminal voltage of the capacitor 62 reaches the output voltage of the rectifying and smoothing circuit 63c, the charging circuit 63 performs switching of the switching element 63b to drive the boost chopper 63d. This allows the DC voltage received from the rectifying and smoothing circuit 63c to be boosted and applied to the capacitor 62, whereby the capacitor 62 is charged to a predetermined voltage.

With such a configuration, the capacitor 62 can be charged to a predetermined voltage in a shorter time than the case where switching is necessary from the start of charging in order to boost voltage. Even if the polarity switching frequency of a welding electrode becomes high and the period from the start of charging to discharging is shortened, the capacitor 62 can be charged to the predetermined voltage owing to the shorter charging time. This can further suppress the occurrence of an arc break.

Figure 5A:
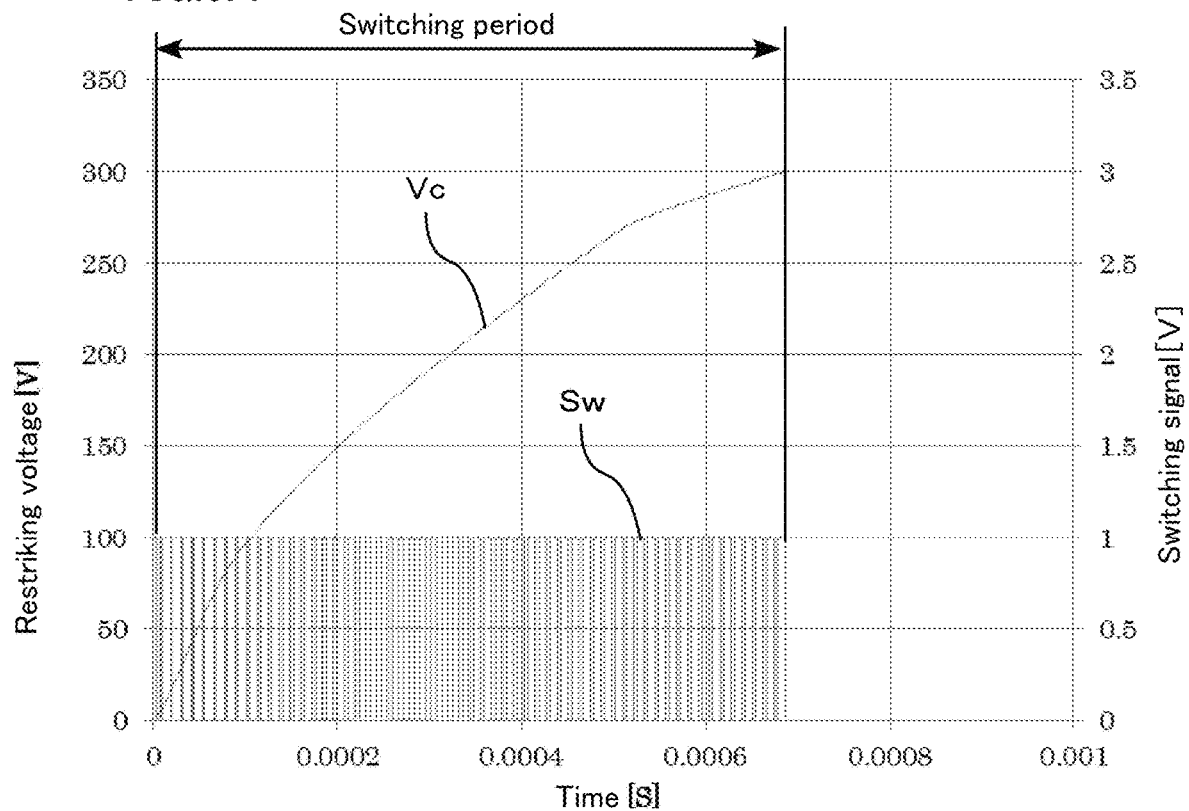
FIG. 5A shows the charging time of a restriking capacitor in a welding power supply device of a comparative example.
Figure 5B:
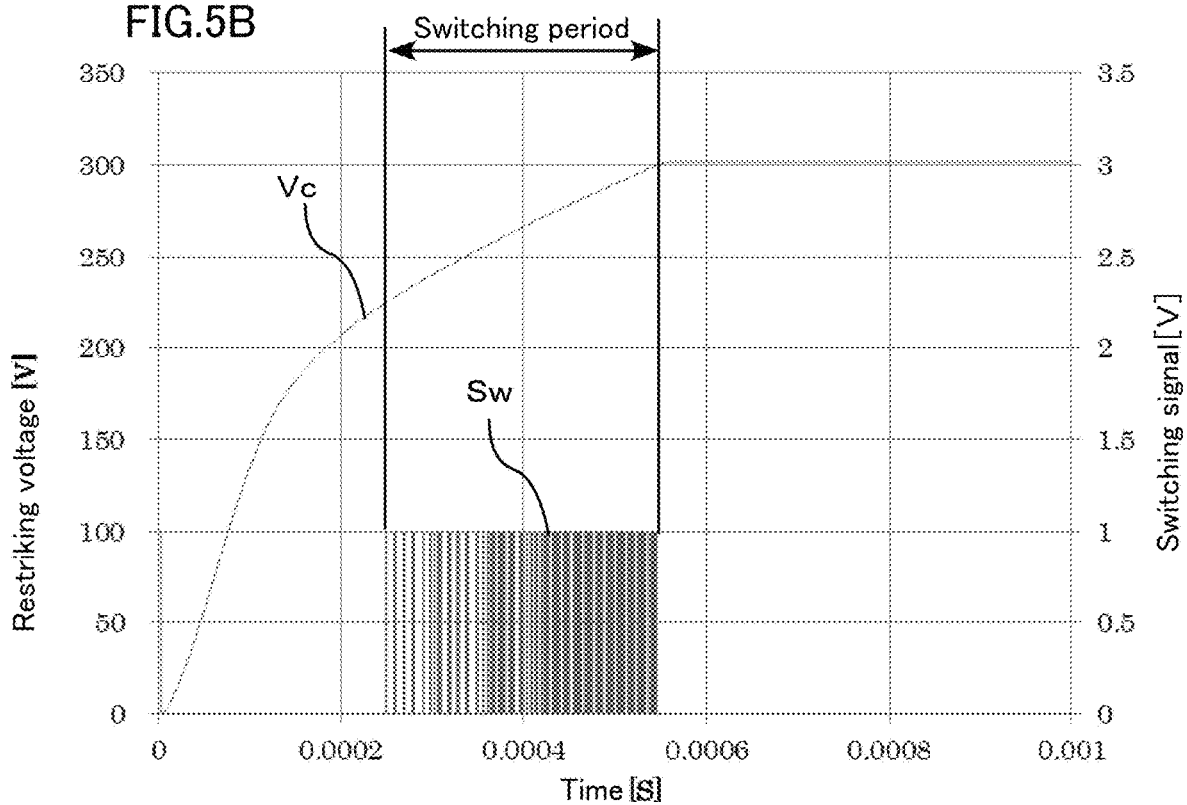
FIG. 5B shows the charging time of a restriking capacitor in a welding power supply device according to the first embodiment.

FIGS. 5A and 5B show simulation results regarding the time required to charge the capacitor 62 to the predetermined voltage, where the simulation was performed on a welding power supply device A100 (shown in FIG. 10) in a comparative example and the welding power supply device A1. FIG. 5A shows the simulation result of the welding power supply device A100 (comparative example), and FIG. 5B shows the simulation result of the welding power supply device A1. Each of the simulation results shows the waveform of the inter-terminal voltage Vc of the capacitor 62 and the waveform of the switching signal Sw of the charging circuit 63 (630).

Figure 10:
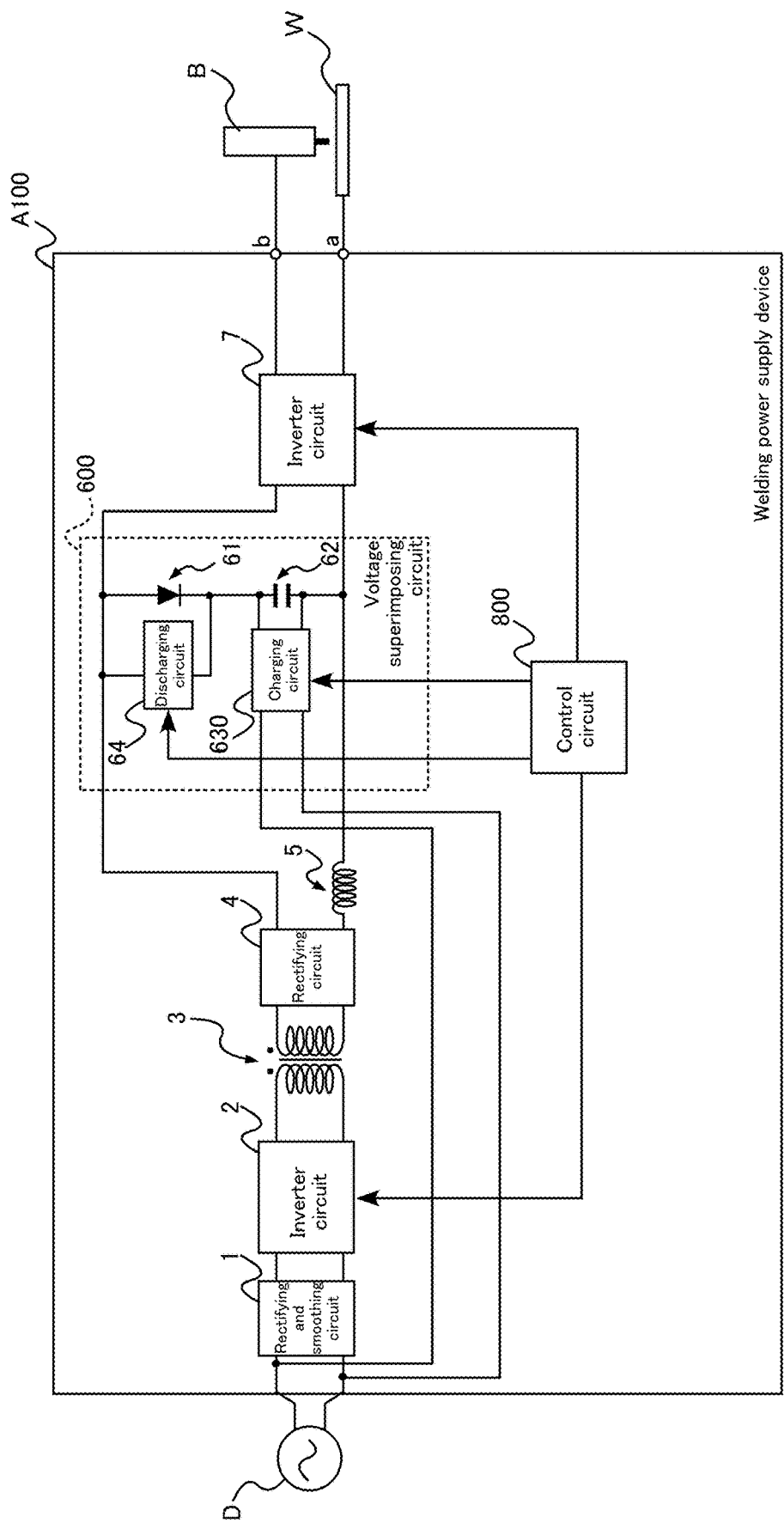
FIG. 10 is a block diagram showing a comparative example (welding power supply device).

With reference to FIG. 10, the welding power supply device A100 in the comparative example is described briefly. The welding power supply device A100 includes a rectifying and smoothing circuit 1, an inverter circuit 2, a transformer 3, and so on. The AC power from the commercial power supply D is converted to the DC power via these circuits and input to the inverter circuit 7. The inverter circuit 7 converts the input DC power to AC power and outputs the AC power. A voltage superimposing circuit 600 discharges the voltage charged in the capacitor 62 when the polarity of the output current of the inverter circuit 7 changes, and superimposes the voltage on the output of the inverter circuit 7. A charging circuit 630 is connected to the commercial power supply D, converts the AC voltage supplied from the commercial power supply D to a predetermined DC voltage, and charges the capacitor 62 with the converted voltage. The charging circuit 630 and a discharging circuit 64 are controlled by a control circuit 800. The charging circuit 630 may be configured to convert the AC voltage of the commercial power supply D to a DC voltage, and transform the DC voltage with a forward converter.

In the charging circuit 630 according to the comparative example, the time required for charging the capacitor 62 is longer. Specifically, as shown in FIG. 5A, switching is necessary from the start of charging in the case of the welding power supply device A100 (see Sw), and charging the capacitor 62 to 300 V requires approximately 0.7 ms of time. This time does not give rise to any significant problem when the polarity switching frequency by the inverter circuit 7 is 200 Hz, for example. However, a problem may arise if the polarity switching frequency is 500 Hz, for example. If the polarity switching frequency is 500 Hz, the cycle of polarity switching is 2 ms. If the polarity switching frequency is increased temporarily in order to increase output, the cycle is even more shortened. As an another case, if the duty ratio of polarity switching changes from 50%, the period of one of the polarities is shortened even if the cycle remains to be ms. In these cases, the capacitor 62 is discharged before it is sufficiently charged. As a result, the voltage superimposed on the output of the inverter circuit 7 is lowered, leading to insufficient energy for re-striking and to the occurrence of an arc break.

On the other hand, as shown in FIG. 5B, the welding power supply device A1 does not perform switching at the start of charging, and begins switching when the voltage Vc reaches approximately 225 V. The time required for the voltage Vc to rise from 0 V to approximately 225 V is approximately 0.25 ms (in the comparative example, the time required for the voltage Vc to rise from 0 V to approximately 225 V is approximately 0.4 ms). Also, the time that takes for the voltage Vc to reach the predetermined voltage (300 V) from 0 V is approximately 0.55 ms, which is approximately 0.15 ms shorter than approximately 0.7 ms in the comparative example (FIG. 5A). This difference corresponds to the difference in time required for the voltage Vc to rise from 0 V to approximately 225 V (0.4 ms-0.25 ms).

According to the present embodiment, the charging circuit 63 stops charging when the inter-terminal voltage of the capacitor 62 (FIG. 3(e)) reaches the predetermined voltage. In this way, the charging circuit 63 prevents the capacitor 62 from being overcharged.

According to the present embodiment, the discharging circuit 64 controls discharge based on the discharging circuit drive signal received from the discharging control unit 85. The discharging circuit drive signal (FIG. 3(c)) is switched on when the switching drive signal (FIG. 3(a)) is switched on or off (t1, t6), and is switched off when the output current (FIG. 3(b)) indicates the minimum value or the maximum value (t3, t8). As understood, the discharging circuit drive signal is always on when the polarity of the output current in the welding power supply device A1 is changed. This allows the discharging circuit 64 to discharge a desired re-striking voltage at an appropriate timing.

According to the present embodiment, the secondary winding 3b and the auxiliary winding 3c in the transformer 3 are insulated from the primary winding 3a, thus preventing the current from the commercial power supply D from flowing into the circuits on the secondary side. Furthermore, in the transformer 3, the secondary winding 3b and the auxiliary winding 3c are insulated from each other. Such configurations can reduce the risk of electric shock.

In the foregoing embodiment, the charging control unit 86 is configured to switch on the charging circuit drive signal when the charging current reaches the predetermined current value or below after discharge ends. Alternatively, the charging circuit drive signal may be switched on when the inter-terminal voltage of the capacitor 62 detected by the voltage sensor 92 is greater than or equal to a predetermined voltage that is based on the output voltage of the rectifying and smoothing circuit 63c (e.g., voltage slightly lower than the output voltage of the rectifying and smoothing circuit 63c). In this case, the charging control unit 86 can generate the charging circuit drive signal, based only on the inter-terminal voltage of the capacitor 62 detected by the voltage sensor 92.

Although the foregoing embodiment describes the case where the waveform of the output current is generally rectangular (see (b)), the waveform of the output current may be a sine wave. The output current can have a sine wave waveform if the waveform target setting unit 84 outputs a sine wave signal for indicating the current waveform target value, and the polarity switching control unit 83 generates a switching drive signal based on both the instantaneous value of the output current detected by the current sensor 91 and the current waveform target value from the waveform target setting unit 84. When the waveform of the output current is a sine wave, the discharging circuit drive signal may be generated based on the instantaneous value of the output current detected by the current sensor 91. For example, it is possible to set a first threshold value that is smaller than the maximum current value and larger than zero and a second threshold value that is larger than the minimum current value and smaller than zero, switch the discharging circuit drive signal on when the instantaneous value of the output current is within the range between the first threshold value and the second threshold value, and switch the discharging circuit drive signal off when the instantaneous value is out of the above range. When the waveform of the output current is a sine wave, the generated arc is wide, resulting in the welding mark being wide. Furthermore, sounds generated by the welding power supply device A1 can be suppressed.

Next, variations on the manner of superimposing the restriking voltage will be described, with reference to FIG. 6. In the foregoing embodiment, the restriking voltage is always superimposed when the polarity of the output current of the welding power supply device A1 changes. In general, an arc break tends to occur when the positive polarity (the output terminal a or the workpiece W is positive, and the output terminal b or the welding torch B is negative) is switched to the reverse polarity (the output terminal a or the workpiece W is negative, and the output terminal b or the welding torch B is positive). In the variation shown in FIG. 6, the restriking voltage is superimposed only when the positive polarity is switched to the reverse polarity, and no re-striking voltage is superimposed when the reverse polarity is switched to the positive polarity. The variation differs from the foregoing embodiment in the method for generating the discharging circuit drive signal by the discharging control unit 85.

Figure 6:
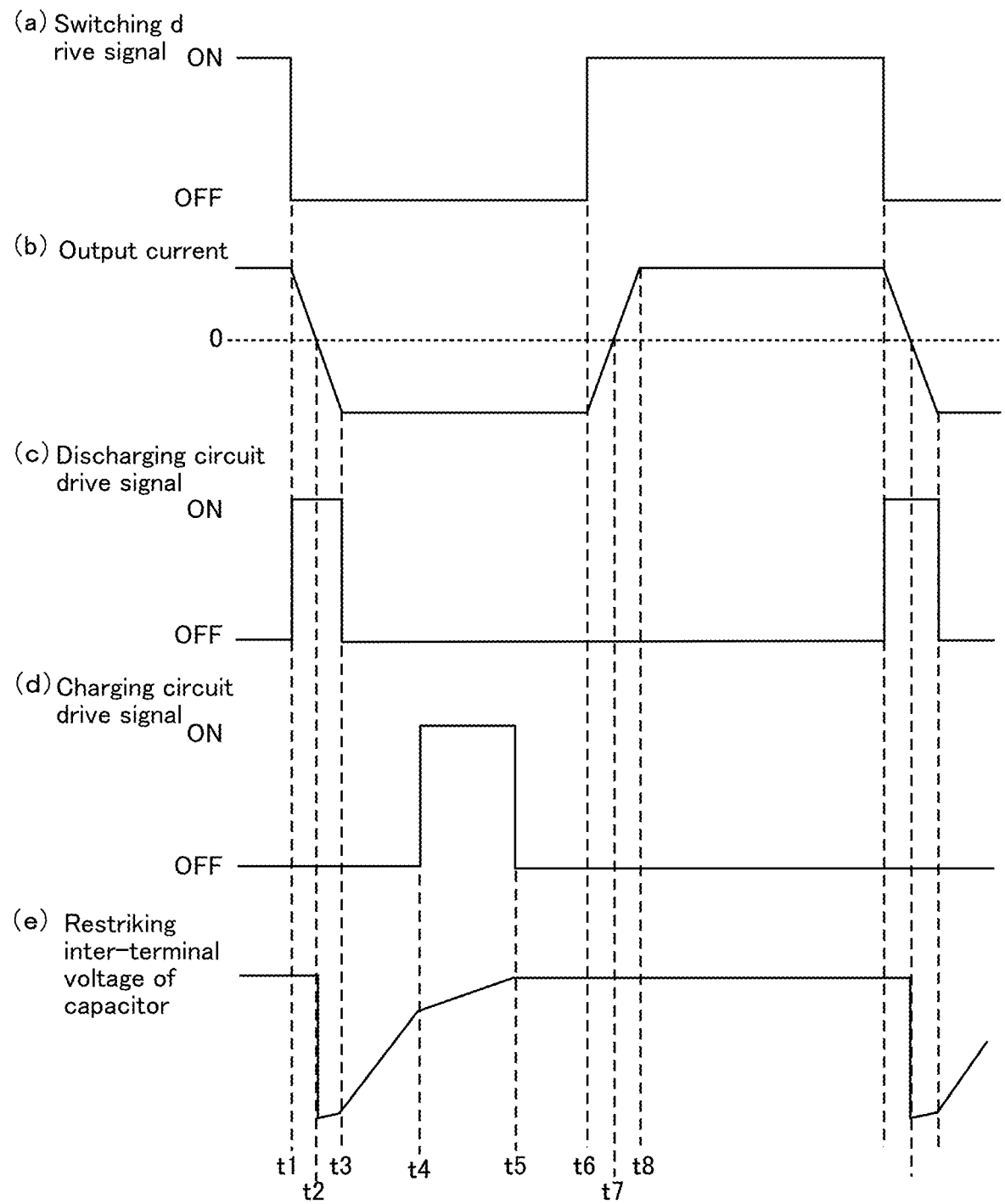
FIG. 6 is a time chart showing the waveform of each signal according to a variation of the first embodiment.

FIG. 6 is a time chart showing the waveform of each signal in the variation. FIG. 6(a) shows the switching drive signal generated by the polarity switching control unit 83, which is the same as that shown in FIG. 3(a). FIG. 6(b) shows the output current of the welding power supply device A1, and is the same as that shown in FIG. 3(b). FIG. 6(c) indicates the discharging circuit drive signal generated by the discharging control unit 85. FIG. 6(d) indicates the charging circuit drive signal generated by the charging control unit 86. FIG. 6(e) indicates the inter-terminal voltage of the capacitor 62.

The discharging control unit 85 according to the variation generates the discharging circuit drive signal that is on when the polarity of the output current of the welding power supply device A1 changes from the positive polarity to the reverse polarity. Specifically, the discharging control unit 85 generates a pulse signal that switches on when the switching drive signal (FIG. 6(a)) is switched from on to off (time t1), and that switches off when the output current (see FIG. 6(b)) of the welding power supply device A1 indicates the minimum current value (time t3). Then, the discharging control unit 85 outputs the pulse signal as the discharging circuit drive signal (FIG. 6(c)). The discharging control unit 85 does not switch the discharging circuit drive signal when the switching drive signal is switched from off to on (time t6), and when the output current of the welding power supply device A1 indicates the maximum current value (time t8).

Since the discharging circuit drive signal (FIG. 6(c)) generated by the discharging control unit 85 is different from the discharging circuit drive signal shown in FIG. 3(c), the charging circuit drive signal (FIG. 6(d)) generated by the charging control unit 86 and the inter-terminal voltage (FIG. 6(e)) of the capacitor 62 have waveforms different from those shown in FIG. 3(d) and FIG. 3(e).

In the foregoing variation, the restriking voltage is superimposed when the positive polarity is switched to the reverse polarity, which is the time at which an arc break tends to occur, so as to suppress the occurrence of an arc break. On the other hand, when the reverse polarity is switched to the positive polarity, the restriking voltage is not superimposed. This makes it possible to reduce loss at the resistor 64b as compared to the case where the re-striking voltage is superimposed even when the reverse polarity is switched to the positive polarity. Furthermore, since the duration from the discharge of the restriking voltage to the next discharge is longer, it is possible to appropriately deal with the situation where the polarity switching frequency is high. For example, even if the polarity switching frequency is twice the frequency shown in FIG. 6, it is possible to charge to the predetermined voltage before discharging.

Next, a second embodiment of the present embodiment is described with reference to FIG. 7. When the re-striking voltage is superimposed only when the positive polarity is switched to the reverse polarity as in the variation described above, the voltage superimposing circuit 6 may be arranged on the output side of the inverter circuit 7. A welding power supply device A2 shown in FIG. 7 has such a configuration as described above.

Figure 7:
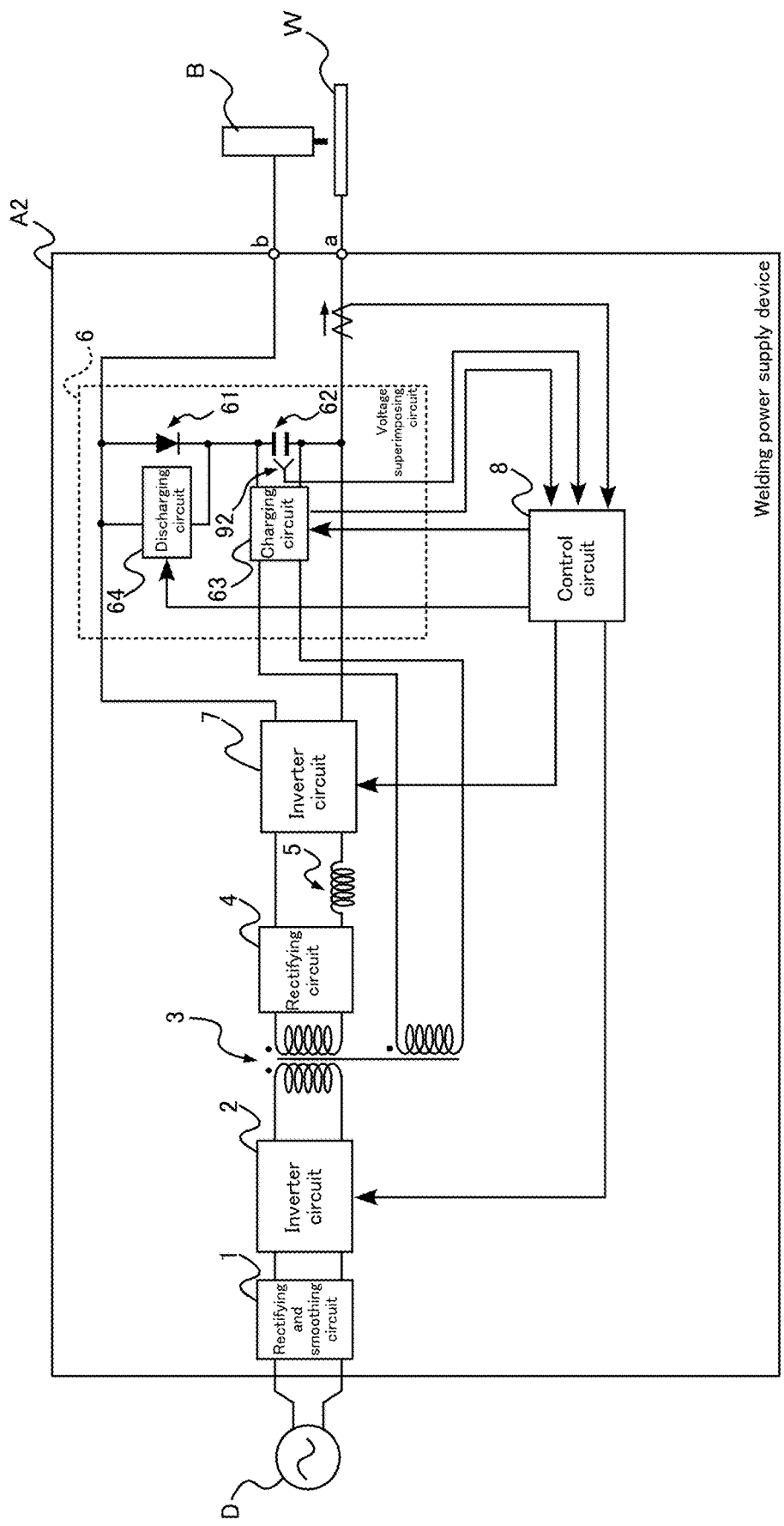
FIG. 7 is a block diagram showing a welding power supply device according to a second embodiment.

FIG. 7 is a block diagram showing the welding power supply device A2. In FIG. 7, elements that are identical or similar to those in the first embodiment (see FIG. 1) are provided with the same reference signs.

In the welding power supply device A2, the voltage superimposing circuit 6 is arranged on the output side of the inverter circuit 7, and a restriking voltage, with a higher potential at the output terminal b (welding torch B) than the output terminal a, is applied between the two output terminals. The discharging circuit 64 is electrically connected when the switching drive signal (FIG. 6(*a*)) is switched from on to off (time t1), and when the polarity of the output current (FIG. 6(*b*)) is changed (time t2), the capacitor 62 is discharged so that the restriking voltage is superimposed between the output terminals a and b.

Since the second embodiment can shorten the time necessary for charging in the same manner as in the first embodiment, the occurrence of an arc break can be appropriately suppressed.

Figure 8A:
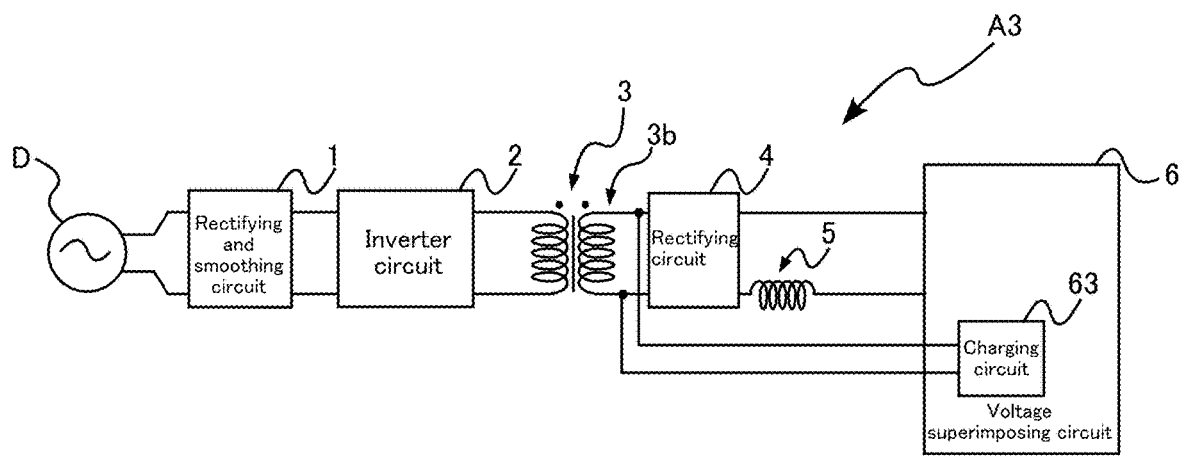
FIG. 8A is a block diagram showing a welding power supply device according to a third embodiment.
Figure 8B:
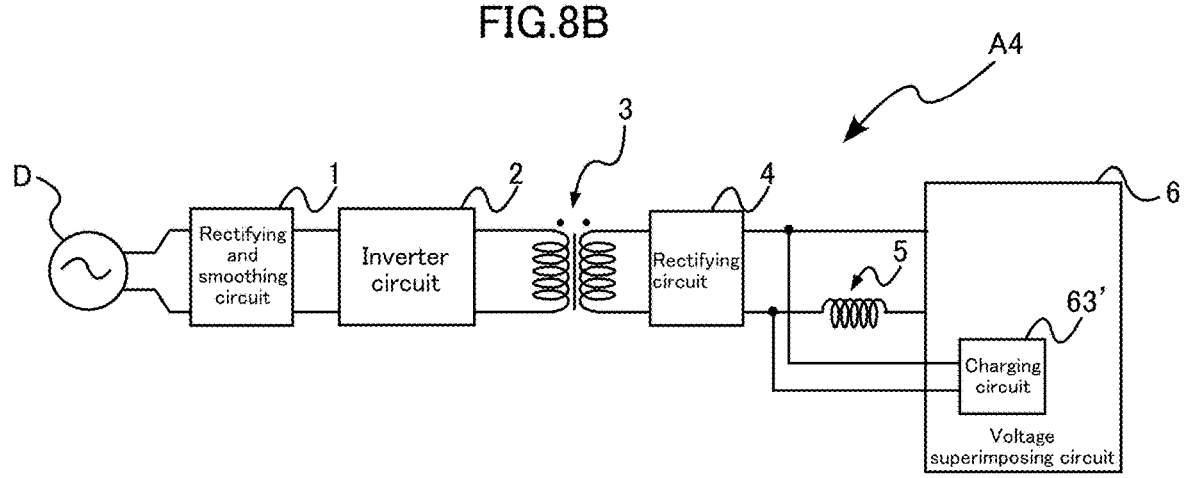
FIG. 8B is a block diagram showing a welding power supply device according to a fourth embodiment.
Figure 8C:
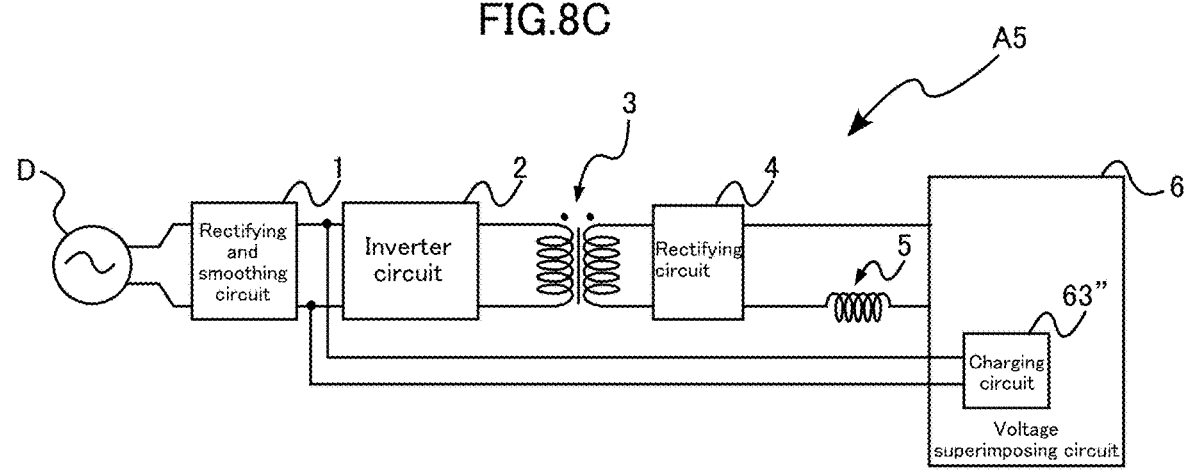
FIG. 8C is a block diagram showing a welding power supply device according to a fifth embodiment.

FIGS. 8A to 8C each show an embodiment according to the configuration of a power supply source to the charging circuit 63. In these figures, elements that are identical or similar to those in the welding system (see FIG. 1) according to the first embodiment are provided with the same reference signs. Note that these figures omit the configurations of elements located more downstream than the voltage superimposing circuit 6, and also omit the description of the control circuit 8.

FIG. 8A is a block diagram showing a welding power supply device A3 according to a third embodiment. The welding power supply device A3 differs from the welding power supply device A1 according to the first embodiment in that the input terminals of the charging circuit 63 are connected to the output terminals of the secondary winding 3*b* of the transformer 3.

Since the third embodiment can shorten the time necessary for charging in the same manner as in the first embodiment, the occurrence of an arc break can be appropriately suppressed. Furthermore, according to the third embodiment, the third auxiliary winding 3*c* is not necessary for the transformer 3, which simplifies the configuration. The input terminals of the charging circuit 63 may be connected to the input terminals of the rectifying and smoothing circuit 1, so that the AC power received from the commercial power supply D can be directly input to the charging circuit 63.

FIG. 8B is a block diagram showing a welding power supply device A4 according to a fourth embodiment. The welding power supply device A4 differs from the welding power supply device A1 according to the first embodiment in that the welding power supply device A4 includes a charging circuit 63' instead of the charging circuit 63, and that the input terminals of the charging circuit 63' are connected to the output terminals of the rectifying circuit 4.

The charging circuit 63' corresponds to a circuit obtained by removing the rectifying circuit from the charging circuit 63 shown in FIG. 2A (but including the smoothing circuit). It is not absolutely necessary for the charging circuit 63' to include a rectifying circuit because of the output voltage input to the charging circuit 63' from the rectifying circuit 4.

Since the fourth embodiment can shorten the time necessary for charging in the same manner as in the first embodiment, the occurrence of an arc break can be appropriately suppressed. Furthermore, according to the fourth embodiment, the charging circuit 63' has a simpler configuration than the charging circuit 63 (FIG. 2A).

FIG. 8C is a block diagram showing a welding power supply device A5 according to a fifth embodiment. The welding power supply device A5 differs from the welding power supply device A1 according to the first embodiment in that the welding power supply device A5 includes a charging circuit 63" instead of the charging circuit 63, and that the input terminals of the charging circuit 63" are connected to the output terminals of the rectifying and smoothing circuit 1.

The charging circuit 63" corresponds to a circuit obtained by removing the rectifying and smoothing circuit 63*c* from the charging circuit 63 (FIG. 2A). It is not absolutely necessary for the charging circuit 63" to include a rectifying and smoothing circuit because of the output voltage input to the charging circuit 63" from the rectifying and smoothing circuit 1.

Since the fifth embodiment can shorten the time necessary for charging in the same manner as in the first embodiment, the occurrence of an arc break can be appropriately suppressed. Furthermore, according to the fifth embodiment, the charging circuit 63" has a simpler configuration than the charging circuit 63.

Figure 9:
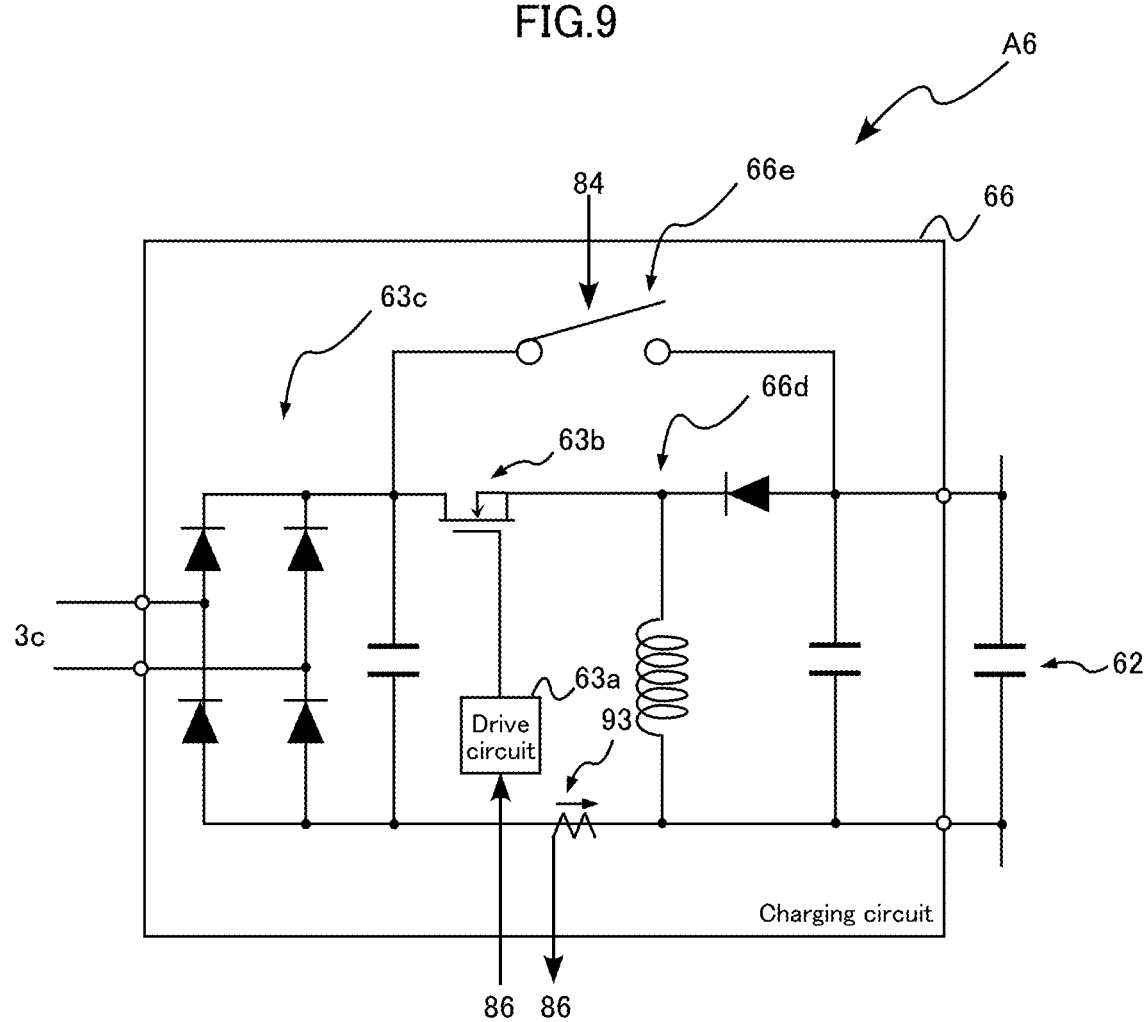
FIG. 9 is a circuit diagram showing a charging circuit according to a sixth embodiment.

FIG. 9 is a circuit diagram showing a charging circuit 66 of a welding power supply device A6 according to a sixth embodiment. As shown in FIG. 9, the welding power supply device A6 differs from the welding power supply device A1 according to the first embodiment in the configuration of the charging circuit 66. In FIG. 9, elements that are identical or similar to those in the charging circuit 63 according to the first embodiment (see FIG. 2A) are provided with the same reference signs. Since the welding power supply device A6 has the same configuration as the welding power supply device A1 according to the first embodiment except the charging circuit 66, the descriptions of the same configuration are omitted.

As shown in FIG. 9, the charging circuit 66 includes a rectifying and smoothing circuit 63*c*, a buck-boost chopper circuit 66*d*, and an opening/closing switch 66*e*. The rectifying and smoothing circuit 63*c* may be identical to the rectifying and smoothing circuit 63*c* according to the first embodiment.

The buck-boost chopper circuit 66*d* boosts the DC voltage received from the rectifying and smoothing circuit 63*c*, and outputs the boosted DC voltage to the capacitor 62. The buck-boost chopper circuit 66*d* includes a switching element (MOSFET) 63*b* and a diode connected in series between an input terminal and an output terminal. Specifically, a source terminal of the switching element 63*b* and a cathode terminal of the diode are connected to each other with the switching element 63*b* being on the input terminal side and the diode being on the output terminal side. Also, one end of a coil is connected to a connection between the switching element (MOSFET) 63*b* and the diode, and an anode terminal of the diode is connected to one end of a capacitor. The configuration of the buck-boost chopper circuit 66*d* is not limited to the illustrated example. According to the present embodiment, the switching element 63b is a MOSFET, but it may be a bipolar transistor such as an IGBT. As with the drive circuit 63a according to the first embodiment, a drive circuit 63a outputs a pulse signal according to a charging circuit drive signal received from a charging control unit 86.

The opening/closing switch 66e is arranged to bridge the input terminal and output terminal of the buck-boost chopper circuit 66d. When the switch is closed (to create a closed path), the input terminal and the output terminal are electrically connected to each other. On the other hand, when the switch is open (to create an open path), the input terminal and the output terminal are electrically disconnected from each other. The opening/closing switch 66e may be a semiconductor switch or a mechanical switch. The opening/closing switch 66e opens and closes according to the charging circuit drive signal received from the charging control unit 86. Specifically, the opening/closing switch 66e is closed when the charging circuit drive signal is off (e.g., low level signal), and is open when the charging circuit drive signal is on (e.g., high level signal). When the opening/closing switch 66e is closed, the DC voltage from the rectifying and smoothing circuit 63c bypasses the buck-boost chopper circuit 66d and is applied to the capacitor 62. When the opening/closing switch 66e is open, the buck-boost chopper circuit 66d is interposed between the rectifying and smoothing circuit 63c and the capacitor 62. The buck-boost chopper circuit 66d is driven in this state, whereby the DC voltage from the rectifying and smoothing circuit 63c is boosted and applied to the capacitor 62 to charge the capacitor 62. As described above, the charging circuit 66 is configured to switch between a state where the DC voltage from the rectifying and smoothing circuit 63c is directly (without transformation) applied to the capacitor 62 and a state where the DC voltage is boosted and then applied, based on the charging circuit drive signal.

Since the sixth embodiment can shorten the time necessary for charging in the same manner as in the first embodiment, the occurrence of an arc break can be appropriately suppressed. Instead of the buck-boost chopper circuit 66d shown in FIG. 9, a different booster circuit may be provided in the charging circuit 66.

Although the welding power supply devices A1 to A6 as described above can be used for a TIG welding system, the present disclosure is not limited to such. For example, the welding power supply device according to the present disclosure can be used for another semi-automatic welding system. Furthermore, the welding power supply device according to the present disclosure can be used for a fully automatic welding system with a robot, and can also be used for a shielded metal arc welding system.

The welding power supply devices according to the present disclosure are not limited to those in the foregoing embodiments. Various design changes can be made to the specific configurations of the elements in the welding power supply devices according to the present disclosure.

The invention claimed is:

1. A welding power supply device comprising:
an inverter circuit that converts DC power into AC power and outputs the AC power to a welding load; and
a voltage superimposing circuit that superimposes a restriking voltage on an output to the welding load when a polarity of an output current of the inverter circuit switches,
wherein the voltage superimposing circuit includes:
a restriking capacitor to be charged with the restriking voltage;
a charging circuit that charges the restriking capacitor with the restriking voltage; and
a discharging circuit that discharges the restriking voltage charged in the restriking capacitor,
wherein the charging circuit includes:
a DC power supply that outputs DC voltage;
a voltage booster that boosts the DC voltage of the DC power supply; and
a current sensor that is arranged between the DC power supply and the restriking capacitor and inside the charging circuit and that detects a current inputted to the charging circuit,
wherein the charging circuit charges the restriking capacitor in both a first state and a second state following the first state during a period of time between an occurrence of discharging the restriking voltage and a next occurrence of discharging the restriking voltage, the first state being a state in which the DC voltage of the DC power supply is directly applied to the restriking capacitor, the second state being a state in which the DC voltage boosted by the voltage booster is applied to the re-striking capacitor, and
wherein the charging circuit switches from the first state to the second state when a value of the current detected by the current sensor decreases down to a predetermined current value for a first time after a most recent one of at least one event that a value of the output current of the inverter circuit changes to its minimum or maximum value occurs.

2. The welding power supply device according to claim 1, wherein the voltage booster is a boost chopper, and
the charging circuit enters the first state by stopping switching of the boost chopper, and enters the second state by switching the boost chopper.

3. The welding power supply device according to claim 1, wherein the charging circuit further includes: a line that bypasses the voltage booster; and switching circuitry that controls closing and opening of the line, and
the charging circuit enters the first state by closing the line, and enters the second state by opening the line and activating the voltage booster.

4. The welding power supply device according to claim 1 further comprising a voltage sensor that detects an interterminal voltage of the restriking capacitor,
wherein the charging circuit switches from the first state to the second state based on a value of the voltage detected by the voltage sensor.

5. The welding power supply device according to claim 1, wherein the voltage superimposing circuit superimposes the restriking voltage only when a current outputted through an output terminal to a workpiece of the welding load switches from positive to negative.

6. The welding power supply device according to claim 1, further comprising a transformer that insulates a commercial power supply and the inverter circuit,
wherein the DC power supply converts AC voltage outputted by an auxiliary winding of the transformer into DC voltage and outputs the DC voltage.

* * * * *